United States Patent [19]

Hertel

[11] Patent Number: 5,453,782

[45] Date of Patent: Sep. 26, 1995

[54] AUTOMATIC EXPOSURE AND GAIN CONTROL FOR LOW LIGHT LEVEL TELEVISION CAMERA

[75] Inventor: Richard J. Hertel, Fort Wayne, Ind.

[73] Assignee: ITT Corporation, New York, N.Y.

[21] Appl. No.: 197,858

[22] Filed: Feb. 17, 1994

[51] Int. Cl.⁶ .................................................. H04N 5/38
[52] U.S. Cl. ........................................ 348/217; 348/229
[58] Field of Search ...................... 250/214 VT; 348/302, 348/229, 217, 216

[56] References Cited

U.S. PATENT DOCUMENTS

| | | | |
|---|---|---|---|
| 3,691,302 | 9/1972 | Gaebele et al. | 348/217 |
| 4,050,085 | 9/1977 | Prince et al. | 348/217 |
| 4,071,752 | 1/1978 | Manning | 250/227.28 |
| 4,495,520 | 1/1985 | Kravitz et al. | 348/229 |
| 4,603,250 | 7/1986 | Contini et al. | 250/214 VT |
| 4,882,481 | 11/1989 | Gilligan et al. | 250/214 VT |
| 4,888,644 | 12/1989 | Wilson | 348/371 |
| 5,134,489 | 7/1992 | Sauer | 348/302 |
| 5,198,657 | 3/1993 | Trost et al. | 250/214 VT |
| 5,218,194 | 6/1993 | Gabi et al. | 250/214 VT |

Primary Examiner—Donald J. Yusko
Assistant Examiner—Michael Day
Attorney, Agent, or Firm—Arthur L. Plevy; Patrick M. Hogan

[57] ABSTRACT

A pick-up tube of a camera device is optically coupled to an image intensifier tube. An exposure control circuit is provided which monitors the charge supplied to the phosphor screen of an image intensifier device and, thus, to the photodetector of the pickup tube, and which varies the exposure time in accordance with the level of scene illumination and the charge storage capability of the photodetector. The exposure control system also adjusts the gain of the image intensifier in accordance with the scene illumination prior to readout of the photodetector in order to optimize the signal to noise ratio.

15 Claims, 2 Drawing Sheets

AUTOMATIC EXPOSURE AND GAIN CONTROL FOR LOW LIGHT LEVEL TELEVISION CAMERA

BACKGROUND OF THE INVENTION

1. Field of the Invention

The present invention relates generally to electro-optical devices and, more particularly, to an exposure controller for use with an image pick-up device having an optical preamplifier such as an image intensifier coupled thereto.

2. Description of the Prior Art

In an image device such as an electronic camera, the product of light intensity, detector sensitivity, and time determines the amount of stored charge. Overexposure occurs when the product exceeds the charge storage capacity and information about the bright areas of the image is lost. Underexposure occurs when the product for the brightest areas is much less than the capacity and information about the darker areas of the image is lost. Exposure control of a camera seeks to adjust the intensity, sensitivity, and time product to optimize the image quality from the camera.

Camera exposure control can be performed either manually or automatically. To effect exposure control manually, the camera operator must adjust some component of the camera to achieve optimum image quality. For example, the operator may adjust the iris of the camera lens to admit more or less light. Manual exposure control, however, is often slow to respond to changes in scene illumination. Accordingly, automatic exposure control based upon the level of the video signal leaving the camera is often preferred because it can respond faster to such scene changes than manual operation and is simple to implement. However, even when automatic exposure control circuitry is present, if the change in illumination is too large from one field or frame to the next, saturation may obscure how much exposure adjustment is needed to accommodate the new light level, and many frames may be required to recover the correct exposure condition.

Specifically, when saturation occurs with a post storage or post readout exposure controller, the controller must search over several readout periods to re-establish the new, correct exposure level because the controller has no information about the degree of over exposure that occurred and must therefore follow a preprogrammed, all purpose recovery strategy. Furthermore, a second light sensor is generally needed if the exposure controller must get the correct exposure in a single frame.

Accordingly, it is an object of the present invention to provide an exposure controller circuit for a camera which is adapted to measure the intensity, sensitivity, and time product for each field or frame and which is operable in response to such measurements to adjust the exposure time in accordance with the charge storage capability of the pickup tube of the camera.

It is yet another object of the present invention to provide an exposure controller circuit which optimizes the signal to noise ratio of the camera pickup tube by adjusting the gain of an optical preamplifier coupled thereto.

SUMMARY OF THE INVENTION

An image pick-up device of a camera device is optically coupled to an image intensifier tube. An exposure control circuit is provided which monitors the charge supplied to the phosphor screen of an image intensifier device and, thus, to the photodetector of the image pickup device, and which varies the exposure time in accordance with the level of scene illumination and the charge storage capability of the photodetector.

Exposure is monitored by integrating the charge supplied to the photodetector via the phosphor screen. A comparator compares the output of the integrator with a predetermined threshold, a threshold based on the charge capacity of the photodetector, and if the charge capacity of the photodetector has not been reached or exceeded, the gain of the image intensifier is adjusted to optimize the signal to noise ratio. Optimization is accomplished by maximizing the integration time and minimizing the gain of the image intensifier. Specifically, if there is insufficient charge available to exceed the charge threshold, in the maximum available integration time, then the gain is incrementally increased until either a maximum acceptable voltage is applied between the photocathode and phosphor screen or across the microchannel plate, if a microchannel plate is present. If the amount of charge exceeds the charge storage capacity during a frame, the adjustable voltage is incrementally decreased until a minimum acceptable gain is achieved.

DETAILED DESCRIPTION OF THE INVENTION

As indicated, it is contemplated that the exposure controller circuit of the present invention may be used in combination with several commonly available image pickup devices such as: scanning vacuum tubes of which a vidicon is an example; solid state, self-scan devices of which charge coupled devices (CCDs), charge injection devices (CIDs), and photodiode arrays with multiplexers are examples; non-scanning devices with additional, external electronic storage of which metal, resistive, and wire anode photomultiplier tubes (PMTs) are examples; and non-scanning devices with electro-chemical storage of which photographic film or an eye are examples. In each case, an image is stored during a field or frame period and thereafter displayed on a video screen or recorded on film. Many additional uses and combinations for the exposure controller circuit of the present invention will become obvious to those skilled in the art. Thus, in FIG. 1, there is illustrated an exemplary embodiment of the present invention which utilizes an image pick-up device comprising an image pickup tube 30 which forms part of a television camera. This television camera system may be suitable for standardized or non-standardized black-and-white or color television. More than one pickup tube may be used in the latter case. It should become obvious to one of ordinary skill in the art that many other embodiments using other as mentioned pick-up devices are possible to demonstrate the exposure controller of the present invention.

Figure 1:
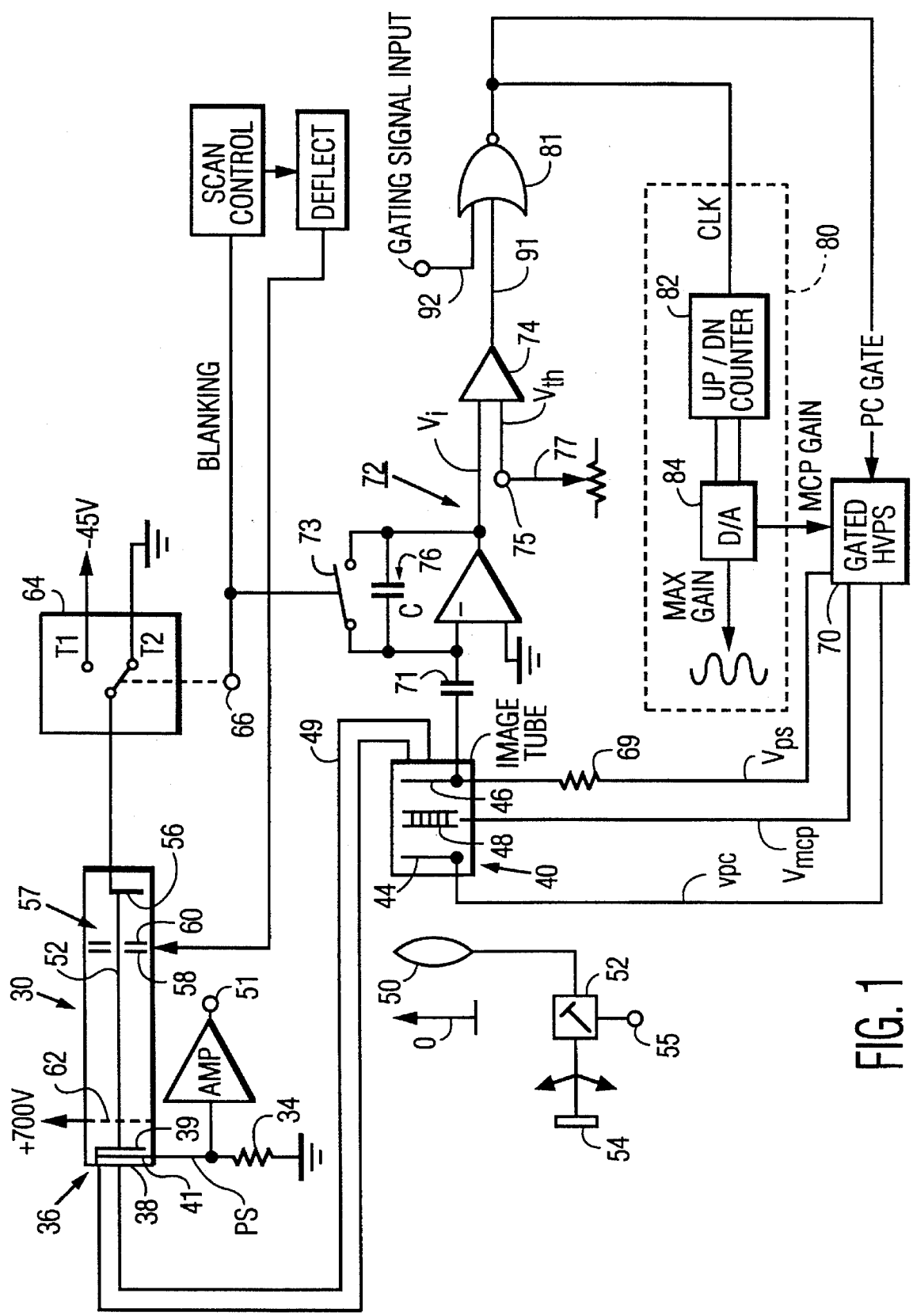
FIG. 1 is a block diagram of an exemplary camera system utilizing the exposure controller circuit of the present invention.

In the illustrative embodiment depicted in FIG. 1, the pickup tube 30 is combined with a camera control unit either remote from or integral with the camera. Picture and waveform display devices and picture pickup and display devices for storing picture information (not shown) may, of course, be part of the camera system. With continuing reference to FIG. 1, it can be seen that an optical preamplifier in the form of image intensifier tube 40 is optically coupled to the pickup tube 30. An image of an object is made much brighter by means of image intensifier tube 40 and is used as the input image for image pickup tube 30, thereby increasing the sensitivity thereof. As will be readily appreciated by those of ordinary skill in the art, the operation of an image intensifier tube as 40 is well known. See for example, U.S. Pat. No. 5,023,511 entitled OPTICAL ELEMENT OUTPUT FOR AN IMAGE INTENSIFIER DEVICE and issued to Earle N. Phillips on Jun. 11, 1991, which patent is assigned to the assignee of the present application.

Essentially, the image intensifier tube 40 depicted in FIG. 1 comprises three main electro-optical components, namely a photocathode 44, a phosphor screen (anode) 46, and a microchannel plate (MCP) 48. Photocathode 44 is extremely sensitive to low-intensity levels of light in the 100–900 nm range of the electromagnetic spectrum. MCP 48 is a mosaic of several million long thin tubes of glass with a high PbO content made slightly conductive in a hydrogen firing process. MCPs currently used in image intensifying typically have a center to center channel spacing of 6 to 15 μm. When a potential difference of 500 to 1,000 V is applied between the metalized ends, a uniform electric field is established within each channel. In operation, an optical image impinging on the photocathode causes the emission of electrons which are attracted to the microchannel plate which is maintained at a higher positive potential than the photocathode. Electrons impinging on the MCP 48 result in the emission of a number of secondary electrons which in turn causes the emission of more secondary electrons. The electrons emanating from MCP 48, which electrons are indicative of the input optical image information, impinge on phosphor screen 46 causing the screen to fluoresce and reproduce the input image. In order that the light emanating from the phosphor screen may be transmitted to pickup tube 30, image intensifier tube 40 is coupled thereto via a fiber optic cable or other suitable optical coupling means 49.

A diaphragm or aperture stop 50 is preferably arranged in front of image intensifier tube 40 and coupled to a stop control module 52. The control module 52 may have a manual control 54 and/or a control input terminal 55 which permits automatic control by the application of a control signal thereto. Thus, light originating from an object 0 is incident on photocathode 44 via the diaphragm aperture 50. In pickup tube 30, the light passes through a window to a target plate electrode 36. Target 36 typically comprises a transparent, electrically conductive metal layer or signal electrode 38 and a photosensitive semiconductor layer 39.

The intensified image of object 0 originating from phosphor screen 46 is converted in the photosensitive semiconductor layer 39 into a potential image which corresponds thereto. The potential image is built-up in the semiconductor layer 39 during a light integration period by the absorption of photons from the incident light. The object 0 may, for example, be a scene to be recorded or a test pattern chart located in front of the camera. In the pick-up tube 30, the semiconductor layer 39 of the target plate electrode 36 is scanned in lines and fields by an electron beam 52. Signal electrode 38 is connected to an output terminal 41 from which a picture signal PS of pickup tube 30 is obtained. The output is further connected to ground via a resistor 54. During the field scan of the target plate electrode 36, the potential image thereon is converted into an electrode current through the resistor 54. The corresponding voltage drop across the resistor 54 results in the picture signal PS.

Pickup tube further includes an electron gun 57 which produces electron beam 52. Electron gun 57 comprises a cathode 56, a first electrode 60 and a second electrode 58. First electrode 60 is a current setting and control electrode while second electrode 58 is an anode electrode. A mesh electrode 62 is arranged near the target plate electrode 36. Cathode 56 is connected to an electronic switching circuit 64. For clarity, circuit 64 is shown as a mechanical switch having two terminals, T1 and T2. Terminal T1 is connected to a suitable voltage source (not shown) which supplies, for example, −45 V, while terminal T2 is connected to ground. A positive voltage, typically +700 V, is applied to mesh electrode 62.

The switching circuit 64 is switched by applying a switching signal to a switching input 66, which switching input is connected to a switching input terminal. A line and field blanking signal, which is customary in television, is applied to input 66. During line and field blanking periods, the terminal T2 is connected to cathode 56. The electron beam 52 is then blanked. No current can flow via resistor 54, target plate electrode 36, the beam 52, cathode 56, or switching circuit 66 because both T2 and resistor 54 are connected to ground. When no blanking signals are input, terminal T1 is connected to cathode 56 so that electrons can flow via electron beam 52 through resistor 54 and to target plate electrode 36.

The current intensity of the electron beam 52 is essentially determined by the voltage at first electrode 60. The current distribution over the resistor 54 and the target plate electrode 36 depends on the potential in the potential image on the target plate electrode in the region where electron beam 52 is incident. Disregarding the voltage drop across electron beam 52, the semiconductor layer 39 of target plate electrode 62 is brought to −45 V by the electron beam. The charge required is therefore deposited in situ by the electron beam and the superfluous charge in the beam is conveyed to mesh electrode 62. The charge deposited also corresponds to the current flowing through resistor 54.

With an increasing luminous flux on the target plate electrode, more charge is deposited there by electron beam 52 to stabilize the semiconductor layer at −45 V, until ultimately all of the available charge has been deposited. It will thus be appreciated that with a still further increasing supply of light, the target plate electrode can no longer be stabilized at −45 V, thereby causing overexposure. Accordingly, as indicated above, a camera system in accordance with the present invention includes a novel exposure controller circuit which will now be described.

With continuing reference to FIG. 1, it will be observed that there is coupled to image intensifier tube 40 a gated high voltage power supply (HVPS) 70 which provides pulsed and DC voltages. A convenient arrangement of supply voltages operates the image intensifier tube 40 with the MCP 48 surface nearest the phosphor screen at ground potential. The gated HVPS 70 provides a DC voltage, positive with respect to ground, to the phosphor screen 46 via resistor R 69. This supply voltage is designated Vps. The gated HVPS 70 provides an adjustable DC voltage, positive with respect to ground, to the MCP 48 surface nearest the photocathode 44. This voltage is designated Vmcp. Gated HVPS 70 supplies a pulsed voltage to the photocathode 44. This potential is designated Vpc and has two states: one is positive with respect to $V_{mcp}$ and the other is negative with respect to $V_{mcp}$. As indicated, electrons are attracted to MCP 48 plate when it is at a higher positive potential than photocathode 44. Conversely, electrons are repelled when the MCP is at a lower positive potential than photocathode 44. Therefore, gated HVPS 70 is adapted to switch between two voltages of opposite polarity so that tube 40 can be turned on or off depending upon the polarity and magnitude of voltages $V_{mcp}$ and $V_{pc}$, which voltages are regulated during each image field or frame in a manner to be described.

As shown in FIG. 1, the novel exposure control circuit of the present invention includes a gated integrator 72 coupled to phosphor screen 46 of image intensifier tube 40 via capacitor 71. As will be readily ascertained by those skilled in the art, gated integrator 72 measures the charge delivered to the phosphor screen 46. In the illustrative embodiment, this measurement also corresponds to the charge stored by pickup tube 30 since tube 40 is optically coupled thereto.

The output voltage of integrator 72 ($V_i$) is supplied to a comparator 74 which compares the integrator output voltage $V_i$ with a predetermined threshold voltage $V_{th}$. Comparator 74 converts analog to logic and the logic employed can be TTL, CMOS or any other suitable type of logic. The value of the threshold voltage $V_{th}$ is preferably selected to provide an optimum exposure level for the image device to which it is coupled. The terminal of amplifier 74 designated as 75 is shown coupled to the control arm 77 of a potentiometer to indicate that the threshold voltage may be selectively adjusted as desired. If $V_i$ is equal to or greater than the threshold voltage, the voltages supplied to photocathode 44 and MCP 48 are changed (in a manner which will be described later) so that the photocathode is at the higher potential and the image intensifier is switched off for the duration of the frame or field. The integrator and comparator thus turn image intensifier tube 40 off when a predetermined exposure is exceeded. In this manner, further exposure is prevented after the target plate electrode 36 has reached its charge storage capacity.

Exposure is prevented until the integrator is reset for the next frame by shorting capacitor 76. In the illustrative embodiment of FIG. 1, this is accomplished via a switching circuit 73 which is closed when the field blanking signal pulse is applied thereto and to switching input 66. After resetting of the integrator occurs, the HVPS is directed in a manner to be described below to forward bias the photocathode and MCP, thereby permitting a potential image to again be built-up in the semiconductor layer 39 during a subsequent light integration period. It will thus be readily ascertained by those of ordinary skill in the art that in accordance with the present invention, it is possible to vary the exposure time in accordance with the lighting conditions encountered.

As shown in the illustrative embodiment depicted in FIG. 1, the exposure controller circuit further comprises means 80 to adjust the voltage applied across MCP 48 and thereby modify the gain of image tube 40 in accordance with changing lighting conditions. As is well known, one of the most important criteria for determining the picture quality of a TV camera is the signal to noise ratio. This is measured according to the formula:

SNR-IN-dB=20 log[peak-to-peak video voltage/rms noise voltage]

The signal to noise ratio of a typical camera is set primarily by a preamplifier (not shown) connected to the target of the pickup tube. A typical preamplifier circuit comprises an input stage which has a carefully selected FET and which feeds a wide band amplifier with feedback to the gate of the FET. An equalizing network in the feedback path typically corrects the frequency rolloff due to the target capacitance. The signal to noise ratio performance of a photoconductive tube and preamplifier is high only at relatively high input light levels. Even then, its signal to noise ratio is much inferior to the intrinsic signal to noise ratio of the optical input. If low light level performance is desired, then it is necessary to add a low noise, high gain amplifier ahead of the photoconductive tube. An image intensifier tube is such an amplifier whose performance can approach the signal to noise ratio of a low light level optical image.

Optimum performance requires that the image intensifier tube operate at an appropriate gain. The gain must be high enough to overcome the noise of the FET preamplifier but not so high that bright portions of the scene saturate before the maximum integration time is used. Since image intensifier tube gain is determined by MCP gain, MCP gain must be adjusted for best overall performance.

Figure 2:
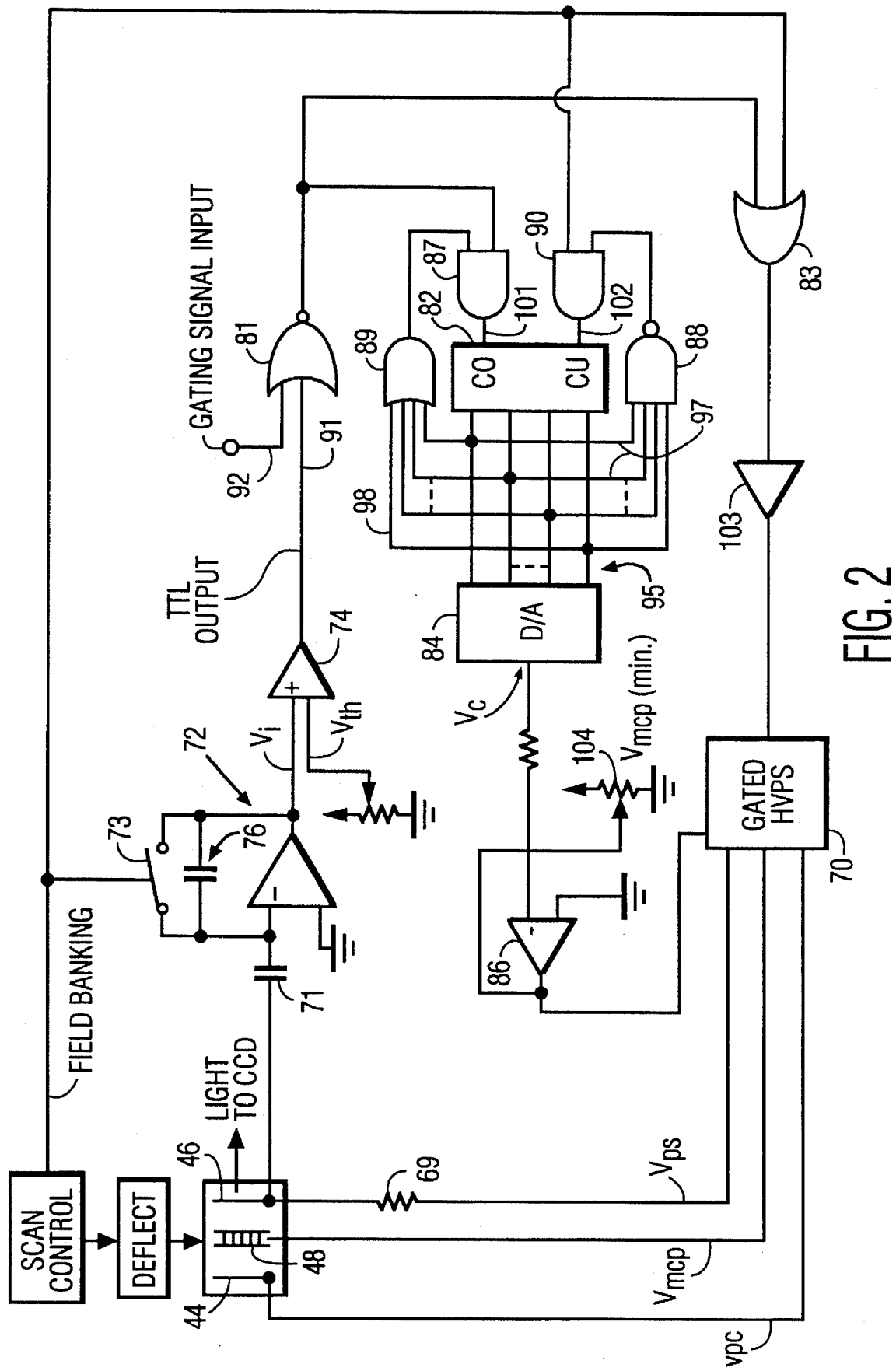
FIG. 2 schematically shows one embodiment of an exposure controller constructed in accordance with the present invention.

As shown in the illustrative embodiment of FIG. 1, one possible means for modifying the gain of MCP 48 is an up-down counter 82 coupled to a digital to analog (D/A) converter 84. A more detailed schematic of an exposure controller circuit in accordance with the present invention which incorporates means 80 for modifying the MCP gain is disclosed in FIG. 2. In the embodiment depicted in FIG. 2, adjusting means 80 comprises an 8-bit up/down counter 82, 8-bit digital to analog (D/A) converter 84, and an operational amplifier 86.

As indicated above, comparator 74 compares the integrator output voltage $V_i$ with a predetermined threshold voltage $V_{th}$ and supplies a TTL output to input terminal 91 of "OR" gate 81. The other input terminal 92 of OR gate 81 receives a desired gating signal. Counter 82 receives, via "AND" gate 87, a TTL output pulse from "OR" gate 81 which pulse is indicative of whether the charge storage threshold of the camera tube has been reached. If at the current MCP gain there is insufficient light available to exceed the charge threshold of the camera pick-up tube, the MCP voltage $V_{mcp}$ is raised each field (i.e., odd or even) until either maximum voltage occurs or until the integrator is reset. If there is sufficient light to exceed the charge threshold, the MCP voltage is decreased with each "full exposure" until a minimum voltage value is reached.

It will be observed that an additional "OR" gate 83 may be coupled to gated HVPS 70 so that other gating signals (not shown) may be input thereto. (OR gate 83 is followed by an amplifier 103). For example, frame transfer CCDs serving in place of camera tube 30 often require that the optical input be off during transfer. As such, gated HVPS 70 is adapted to change the potential bias between the MCP and photocathode when a field blanking pulse is applied to "OR" gate 83. The circuit relies on the linearity of the image intensifier tube phosphor screen material: current-in-to-light out linearity and the linearity of the camera tube response to light. The current or charge in the photodetector of the camera is proportional to the current or charge incident on the phosphor screen.

When $V_i$ is less than $V_{th}$, the output of comparator 74 is a "0", which is communicated to the input lead 91 of OR gate 81, and no down count is initiated. (The output of comparator 74 is coupled to the down count input "CD" of the up/down counter 82 via NOR gate 81 and NAND gate 87, the latter having an output 101 connected to the CD input). Instead, the output from "NAND" gate 88 is a "1", thereby initiating an up count via "AND" gate 90. (The output terminal 102 of NAND gate 90 is connected to the count up input "CU" of the up/down counter 82). Each time a TTL pulse is output by comparator 74, an updated digital voltage value is stored in counter 82, conveyed as a digital word to D/A converter 84 via output lines 95, and converted by D/A converter 84 into an analog signal voltage Vc which represents the amount of voltage to be added to the minimum acceptable gain voltage $V_{MCP(min)}$ to obtain an updated $V_{mcp}$ voltage value. The eight inputs 97 of NAND gate 88 are coupled to the eight outputs 95 of the 8-bit up-down counter 82. The eight inputs 98 of the OR gate 89 are also coupled to the eight outputs 95. The output $V_c$ of D/A converter 84 is input into the negative terminal of inverting amplifier 86. The negative terminal of amplifier 86 is also shown coupled to a potentiometer 104 which is indicative of the adjustable aspect of $V_{MCP(min)}$. The inverted output signal of amplifier 86 is applied to gated HVPS 70 whereby $V_{mcp}$ may be transmitted to MCP 48.

Counter 82 and converter 84 are also used to decrease the gain of MCP 48 when there is sufficient light to exceed the charge threshold of the camera tube. Essentially, the digital output signal from comparator 74 is a "1" when the threshold of the camera represented has been reached. During each field or frame that the comparator indicates full exposure, a "down" count is initiated which incrementally decreases the amount added to $V_{MCP(min)}$ by op amp 86. The down count proceeds under these conditions until $V_{MCP(min)}$ is reached.

From the foregoing description of the illustrative embodiment, it will be understood that the exposure controller of the present invention permits an image to be formed using the maximum number of photoelectrons from the image intensifier photocathode. Additionally, the exposure controller adjusts both gain and exposure time, thereby permitting a wider range (in excess of 100,000:1) of adjustment as compared to those of the prior art in which only the gain is adjusted, such prior art systems being limited to a range of approximately 100:1.

It should also be apparent that the exposure controller of the present invention responds rapidly to scene illumination changes and without saturation. A typical phosphor screen current is to 3 nA. Maximum integration time is 1/60th of a second for a RS-170 standard TV camera, the integrator capacitor typically having a capacitance of 100 pF. While the time required to switch image intensifier tube 40 off will usually be determined by the driver used to change the polarity of the photocathode to MCP bias, the image tube itself will switch in less than 1 ns. The present invention measures light intensity prior to each field transfer and thus before any storage or image readout by the image pickup device.

Although the present invention has been described in detail, it should be understood that various changes, substitutions, and alterations can be made herein without departing from the spirit and scope of the invention.

What is claimed is:

1. A camera device comprising:
    image intensifying means including a photocathode section for emitting photoelectrons in response to an input optical image of an object, a phosphor screen section for converting an electron image into an intensified optical image, and a microchannel plate disposed between said photocathode section and said phosphor screen section, said phosphor screen section capable of storing a charge indicative of said intensified optical image;
    image pickup means optically coupled to said phosphor screen section for storing an associated charge and providing an output signal indicative of said intensified optical image; and
    exposure control means, coupled to said phosphor screen section, for monitoring a level of said charge stored by said phosphor screen section during a frame period, said exposure control means being operative to adjust the amount of time said intensified optical image is supplied to said image pickup means during said frame period in accordance with a charge storage capacity of said image pickup means, said exposure control means including: an integrator having a first input terminal coupled to said phosphor screen section, a second input terminal coupled to a first point of reference potential, and an output terminal, wherein said integrator provides a voltage signal on said output terminal indicative of said charge level; a comparator having a first input terminal coupled to said output terminal of said integrator, a second input terminal coupled to a second point of reference potential, and an output terminal wherein said comparator provides a signal on said output terminal indicative of whether said charge storage capacity has been reached; and means, responsive to said signal on said output terminal of said comparator, for applying a voltage to said microchannel plate to control gain of said image intensifier means in accordance with lighting conditions associated with said input optical image.

2. The device of claim 1, wherein exposure control means is operative to switch off said intensifying means prior to said supplying of said intensified optical image to said image pickup means.

3. The device of claim 2, wherein said exposure control means is operative to switch off said image intensifying means when a predetermined exposure has been exceeded, said predetermined exposure corresponding to said charge storage capacity.

4. The device according to claim 1, wherein said image pickup means comprises a vidicon.

5. The device according to claim 1, wherein said exposure controller means includes means for selectively applying a first potential bias of a given polarity between said photocathode section and said phosphor screen and for selectively applying a second potential bias of an opposite polarity therebetween, wherein said image intensifying means is switched off when said second potential bias is applied.

6. The device according to claim 1 wherein said voltage applying means is adapted to decrease the voltage applied to said microchannel plate if said charge threshold was exceeded during a preceding frame.

7. The device according to claim 1, wherein said voltage applying means is adapted to increase the voltage applied to said microchannel plate while charge is being stored in said photodetector.

8. The device according to claim 1, wherein said exposure control means further includes switching means responsive to said voltage signal for switching off said image intensifying means when said charge storage capacity is reached.

9. The device according to claim 1, including wherein said exposure control means further includes means for resetting said integrator when a field blanking signal is supplied to said image pickup means.

10. The device according to claim 1, wherein said comparator has a digital output and wherein said voltage applying means further comprises an up-down counter coupled to said comparator and a digital to analog converter coupled to said counter.

11. The device according to claim 1, wherein said voltage applying means includes:

a logic gate having a first input terminal coupled to said output terminal of said comparator, a second input terminal for receiving a gating signal, and an output terminal;

an up-down counter having a down-count input terminal coupled to said output terminal of said logic gate, an up-count input terminal for receiving another gating signal, and output terminals wherein a logic word indicative of said gain is provided;

a digital to analog converter coupled to said output terminals of said up-down counter for providing an analog output voltage indicative of said gain;

said analog voltage being provided to said voltage applying means wherein said voltage applying means applies said voltage to said image intensifier means in accordance with said analog voltage.

12. A method for controlling the exposure of a camera device of the type having a photodetector optically coupled to the phosphor screen section of an image intensifier tube, said photodetector having a charge storing capacity and storing a charge indicative of an intensified optical image supplied thereto from said phosphor screen during successive frame periods, said method comprising the steps of:

monitoring a charge level corresponding to said intensified optical image during a frame period;

controlling the amount of time said intensified optical image is supplied to said photodetector by said intensifier tube during each frame period in accordance with said charge storage capacity by switching off said image intensifier tube for the remainder of each frame period in which a predetermined charge level corresponding to said charge storage capacity has been reached;

decreasing gain of said image intensifier tube following each said frame in which said charge storage capacity is reached if said gain is above a predetermined minimum gain threshold; and increasing gain of said image intensifier tube following each said frame in which said charge storage capacity is not reached if said gain is below a predetermined maximum gain threshold.

13. A method according to claim 12, wherein said monitoring step comprises integrating a current supplied to said phosphor screen during said frame period.

14. The method according to claim 12, wherein said step of increasing gain includes:

incrementing a digital count of an up-down digital counter;

converting said incremented digital count to an analog voltage; and increasing gain in accordance with said analog voltage.

15. The method according to claim 14, wherein said step of decreasing gain includes:

decrementing a digital count of said up-down digital counter;

converting said decremented digital count to another analog voltage;

decrementing gain in accordance with said another analog voltage.

* * * * *